March 22, 1960 — D. E. SAFRENO — 2,929,539
RACK FOR VEHICLE CAB
Filed Aug. 19, 1957 — 2 Sheets-Sheet 1
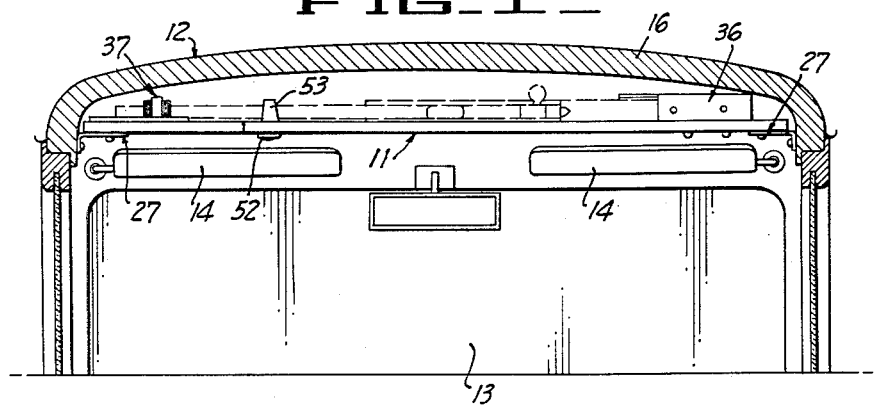
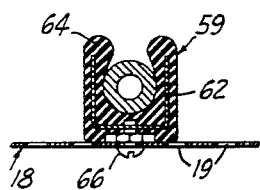
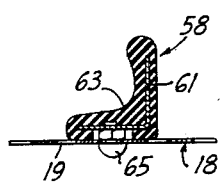
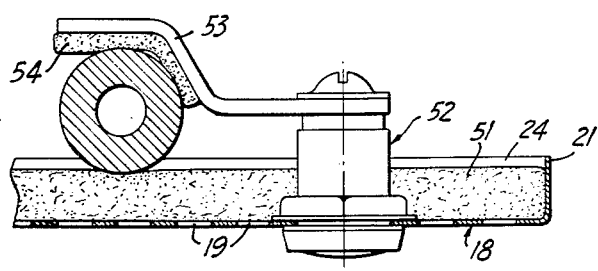
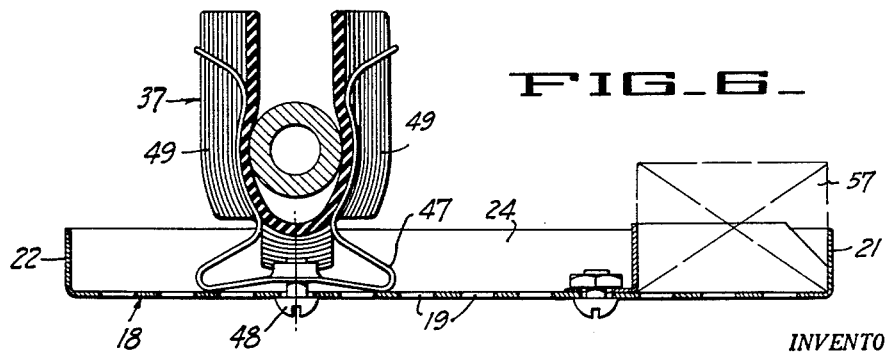
INVENTOR.
Douglas E. Safreno
BY
ATTORNEYS March 22, 1960
D. E. SAFRENO
2,929,539
RACK FOR VEHICLE CAB
Filed Aug. 19, 1957
2 Sheets-Sheet 2
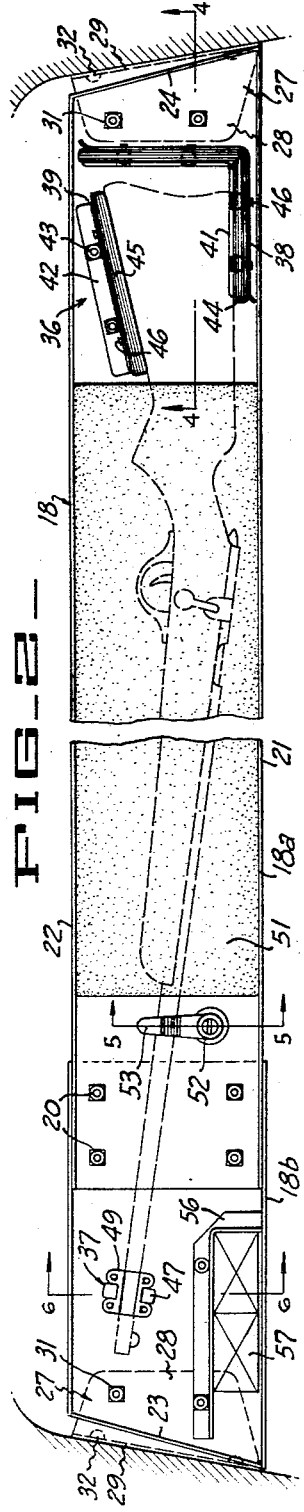
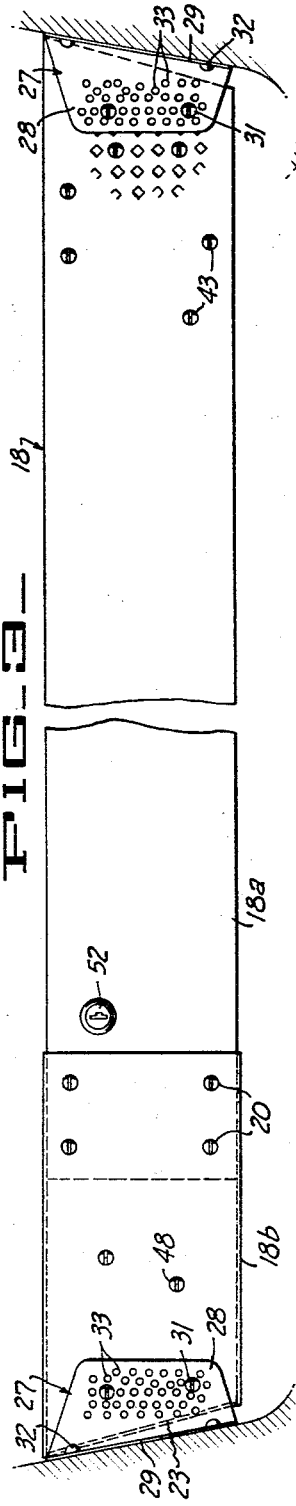
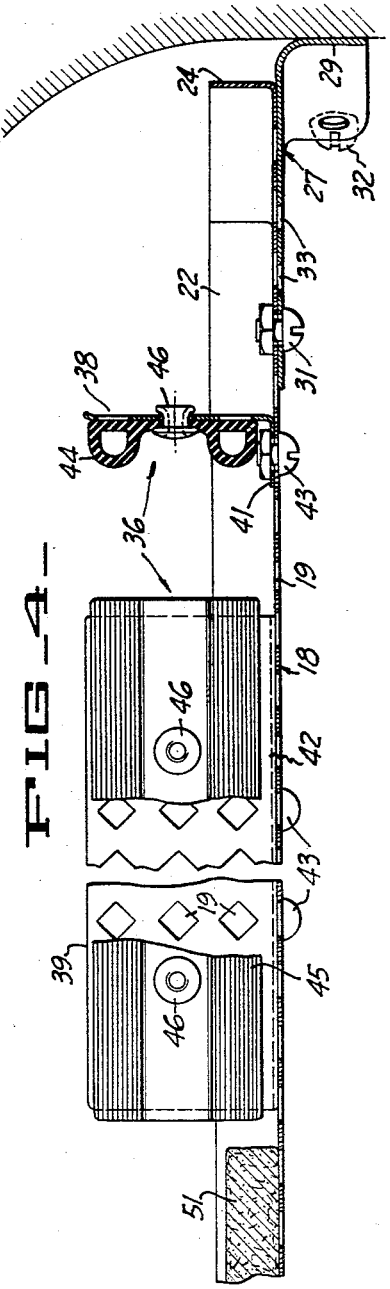
INVENTOR.
Douglas E. Safreno
BY
ATTORNEYS

United States Patent Office 2,929,539
Patented Mar. 22, 1960

2,929,539

RACK FOR VEHICLE CAB

Douglas E. Safreno, Pleasanton, Calif.

Application August 19, 1957, Serial No. 678,985

6 Claims. (Cl. 224—1)

This invention relates generally to racks for mounting in the cabs of vehicles and more particularly to racks of this type suitable for use in carrying guns, magazines, papers and the like.

When carrying a gun in a vehicle, it is desirable to provide means for storing the gun in an out-of-the-way position so that the gun will not be accidently discharged. However, the gun should still be readily accessible to the driver of the vehicle so that the driver may rapidly grab the gun and pursue any game he spots while driving. It is also desirable to provide a rack of this type which can be utilized for storing maps, papers and the like and which will be readily accessible to the driver while operating the vehicle. There is a demand for such a rack which can be readily installed in the cab of a vehicle without making alterations to the vehicle.

In general, it is an object of the invention to provide a rack for mounting in the cab of a vehicle which is particularly useful for the purposes referred to above, namely for a gun rack or for storing maps, papers, and miscellaneous articles.

Another object of the invention is to provide a rack of the above character which may be readily installed in the cab of a vehicle.

Another object of the invention is to provide a rack of the above character which will fit into many different types of vehicle cabs.

Another object of the invention is to provide a rack of the above character which can be readily adjusted to carry different sizes of guns.

Another object of the invention is to provide a rack of the above character in which the gun may be locked onto the rack.

Another object of the invention is to provide a rack of the above character with means for carrying cartridges or shells for the gun.

Another object of the invention is to provide a rack of the above character which is an out-of-the-way position and does not detract from the appearance of the cab of the vehicle.

Additional objects and features of the invention will appear from the following description in which the preferred embodiment has been set forth in detail in conjunction with the accompanying drawing.

Referring to the drawing:

Figure 1 is a side elevational view of a rack incorporating my invention and mounted in the cab of a vehicle;

Figure 2 is a top plan view of the rack shown in Figure 1;

Figure 3 is a bottom plan view of the rack shown in Figure 1;

Figure 4 is a cross-sectional view taken along the line 4—4 of Figure 2;

Figure 5 is a cross-sectional view taken along the line 5—5 of Figure 2;

Figure 6 is a cross-sectional view taken along the line 6—6 of Figure 2;

Figure 7 is another embodiment of a holder for the barrel of the gun for use on the rack; and Figure 8 is another embodiment of a holder for the stock of the gun for use on the rack.

The rack 11 illustrated in the drawing is shown mounted in the cab 12 of a vehicle and extends across the width of the cab above the windshield 13 and the sun visors 14 and below the roof 16 of the cab.

The rack 11 consists of a substantially flat elongated rigid shelf member 18 formed of any suitable material such as metal or plastic. One material found to be particularly suitable is punched sheet steel which is provided with a plurality of perforations or openings 19 spaced over the entire surface of the shelf member. If sheet steel of this type is utilized, the sheet steel can be painted or plated with a suitable material to prevent rusting. The shelf member 18, as shown, consists of two sections 18a and 18b which are fastened together by bolts 20 to provide a shelf member of adjustable length. The shelf member 18 is provided with up-turned side edges 21 and 22 and up-turned end edges 23 and 24. It will be noted that the ends of the shelf member 18 are tapered inwardly toward the back of the shelf member to accommodate the contouring of the cab.

Means is provided for securing the ends of the shelf member 18 to the side walls of the cab 12 and consists of a pair of right angle brackets 27 having legs 28 and 29. The legs 28 are secured to the shelf member 18 by suitable means such as bolts 31. The legs 29 are secured to the side walls of the cab by suitable means such as metal screws 32. It will be noted that the legs 29 are also inclined with respect to the outer extremities of the legs 28 to also accommodate the contouring of the cab. The legs 28 are provided with a plurality of openings 33 spaced at random which are adapted to accommodate the bolts 31. It is readily apparent that since the shelf member 18 is provided with a plurality of openings and since the legs 28 are also provided with a plurality of openings, that the brackets 27 can be fastened to the shelf member 18 in any desired position or angle to accommodate the rack to different shapes of cabs which are produced by various manufacturers. Thus, my rack may be readily mounted in the cab of pickups or trucks. It can also be mounted in the front of an automobile in the same manner.

The rack, as hereinbefore described, can be utilized for carrying maps, pencils, and the like in the cab of a vehicle so that they will be readily accessible to the driver of the vehicle. The up-turned side and end edges of the rack prevent the articles from falling off of the rack.

The rack may also be utilized for carrying guns and is particularly adapted for that purpose as is shown on the drawing. Means, however, must be provided for fastening the gun to the rack. One means found to be particularly suitable consists of stock retaining means 36 for engaging the stock of the gun and barrel retaining means 37 for engaging the barrel of the gun. The stock retaining means consists of an L-shaped member 38 which is adapted to engage the butt end of the stock and one side of the stock, and a separate straight member 39 which is adapted to engage the other side of the stock. The members 38 and 39 can be formed from any suitable material such as punched sheet steel similar to that from which the shelf member 18 is formed and bent to the configuration shown in the drawing. The members 38 and 39 are provided with portions 41 and 42 which are bent at right angles to the major portions of the members 38 and 39 and are fastened to the shelf member 18 by suitable means such as bolts 43. Bumper strips 44 and 45 are fastened to the members 38 and 39 by suitable means such as rivets 46. The bumper strips can be formed of any suitable material such as rubber and are adapted to resiliently engage the stock of the gun and prevent scratching of the stock of the gun by the members 38 and 39.

The barrel retaining means is shown particularly in Figure 6 and consists of a substantially U-shaped spring bracket 47 which is affixed to the shelf member 18 by suitable means such as the screw 48. A resilient mounting bumper strip 49 is mounted within the spring bracket 47 as shown to grasp the barrel and to prevent scratching of the barrel by the spring bracket 47.

A pad 51 of suitable material such as foam rubber is mounted in the shelf member 18 intermediate the ends of the shelf member and is of such a length so as to accommodate a substantial portion of the stock of the gun and serves to provide a resilient mounting for the major portion of the gun to prevent scratching of the gun by the rack.

A swivel lock 52 of the type well known to those skilled in the art is mounted on the shelf member 18 and is provided with an arm 53 provided with a pad 54 of a resilient material which is adapted to grasp the barrel of the gun. The swivel lock in the position shown serves to prevent unauthorized removal of the gun.

Means may also be provided on the shelf member for carrying shells or cartridges for the gun. Thus, as shown, an L-shaped member 56 is positioned near the up-turned side edge 21 of the shelf member and is adapted to clamp the cartons 57 to the shelf member as shown in Figures 2 to securely hold them in place.

In Figures 7 and 8 are shown additional embodiments of the stock retaining means 58 and the barrel retaining means 59. As shown, the major difference from the stock and barrel retaining means 36 and 37 previously described is that the metal members 61 and 62 are completely embedded in a suitable resilient material such as extruded or molded rubber as shown at 63 and 64 in Figures 7 and 8.

The stock retaining means can be in the form of three separate straight sections of the type shown in Figure 8 with one section mounted on each side of the stock of the gun and one at the butt end of the stock of the gun. The stock retaining means 58 and the barrel retaining means 59 can be secured to the shelf member 18 by suitable means such as the nuts and bolts 65 and 66. However, metal screws may be used if desired. With the use of stock and barrel retaining means 58 and 59, a pad 51 is not required because the portions of the gun intermediate the stock and barrel retaining means is supported above the shelf member by the raised rubber portions of the stock and barrel retaining means. By embedding the metal members 61 and 62 in this manner, it is impossible to scratch the gun on the metal members 61 and 62.

It is apparent from the foregoing that I have provided a new and improved rack for use in the cabs of vehicles which is particularly adapted for carrying maps, pencils and the like and which may be provided with suitable fittings to carry a gun so that the gun will be readily accessible to the driver of the vehicle and still be in an out-of-the-way position. It is readily apparent that the brackets, the shelf member, the stock and barrel retaining means and other components of the rack may be shipped disassembled and that upon receipt the user can readily assemble the various components to form the gun rack which can be easily mounted in the cab of the vehicle.

I claim:

1. In a rack mounted in a cab of a vehicle and adapted to carry a gun, a flat elongate rigid shelf member, the shelf member having up-turned side and end edges and having perforations extending the length and width thereof, a pair of brackets having legs extending at substantially right angles to each other, one of the legs of each of the brackets having a plurality of perforations and being detachably secured to the ends of the shelf member, the other of the legs of each of the brackets being adapted to be secured to the side walls of the cab of the vehicle, an L-shaped member and a straight member adapted to retain the stock of the gun, means for detachably securing said L-shaped member and said straight member to said shelf member in accordance with the spacing of the perforations in the shelf member, and a U-shaped member detachably engaging the shelf member and adapted to engage the barrel of the gun.

2. A rack as in claim 1 wherein the gun engaging members are provided with resilient surfaces adapted to engage the gun.

3. A gun rack as in claim 1 wherein the elongate rigid shelf member is formed in two sections, the two sections being releasably secured to each other to permit adjustment of the length of the shelf member.

4. In a gun rack adapted to be mounted in the cab of a vehicle, a flat horizontal elongate rigid shelf member, said shelf member consisting of two pieces of material having perforations provided in the same and extending over substantially the entire surfaces thereof, means for fastening said two pieces together to form a unitary shelf member, perforated pieces and the fastening means permitting adjustment of the shelf member in length to facilitate positioning of the shelf member across the front of the cab above the windshield of the cab, a pair of brackets having legs extending substantially at right angles to each other, one of the legs of each of the brackets being adapted to be secured to the side walls of the cab, means securing the other leg of each of the brackets to an end of the shelf member, said last named means and the perforations in said shelf member permitting positioning of the brackets to accommodatte the contour of the side walls of the cab, stock engaging means adapted to engage the stock of the gun, means extending through the perforations in the shelf member for detachably shecuring the stock engaging means to the shelf member, the perforations in the shelf member permitting positioning of the stock engaging means to accommodate various sizes of gun stocks, barrel engaging means, and means extending through the perforations in the shelf member detachably securing the barrel engaging means to the shelf member, the perforations in the shelf member permitting the positioning of the barrel engaging means to accommodate guns of various sizes.

5. A gun rack as in claim 4 together with means secured to the shelf member and positioned between the barrel engaging member and the stock engaging members for locking onto the rack the gun that is retained by the stock engaging means and barrel engaging means.

6. A gun rack as in claim 4 wherein said stock engaging and barrel engaging means consist of metal reinforced resilient members.

References Cited in the file of this patent

UNITED STATES PATENTS

| | | |
|---|---|---|
| 789,650 | Berg | May 9, 1905 |
| 1,107,624 | Mann | Aug. 18, 1914 |
| 2,266,274 | Schroeder | Dec. 16, 1941 |
| 2,568,046 | Wilkinson | Sept. 18, 1951 |
| 2,628,751 | Bain | Feb. 17, 1953 |
| 2,632,619 | Wilson | Mar. 24, 1953 |
| 2,767,896 | Beck | Oct. 23, 1956 |